W. J. McINTYRE.
LATHE CENTER.
APPLICATION FILED MAY 18, 1909.

960,678.

Patented June 7, 1910.

WITNESSES:
Howard L Holcomb
Josephine M. Strempfer.

INVENTOR:
William J. McIntyre
Harry P. Williams att.

UNITED STATES PATENT OFFICE.

WILLIAM J. McINTYRE, OF HARTFORD, CONNECTICUT.

LATHE-CENTER.

960,678.  Specification of Letters Patent.  Patented June 7, 1910.

Application filed May 18, 1909. Serial No. 496,775.

*To all whom it may concern:*

Be it known that I, WILLIAM J. McINTYRE, a citizen of the United States, residing at Hartford, in the county of Hartford and State of Connecticut, have invented a new and useful Improvement in Lathe-Centers, of which the following is a specification.

This invention relates to the construction of those devices which are applied to the tail stock of a lathe and the like machines, for the purpose of providing a center support for a piece of metal or other stock to be turned or otherwise formed in such machines.

The object of the invention is to provide a simple device for such purpose having a "live" tip, point or center, that is, a tip which turns with the stock, rather than remaining stationary and having the work turn on it, which live tip is firmly supported so that it holds the stock true, and which turns with a minimum friction, the amount of which and the pressure against the stock can be readily and accurately adjusted at any time.

Figure 1:
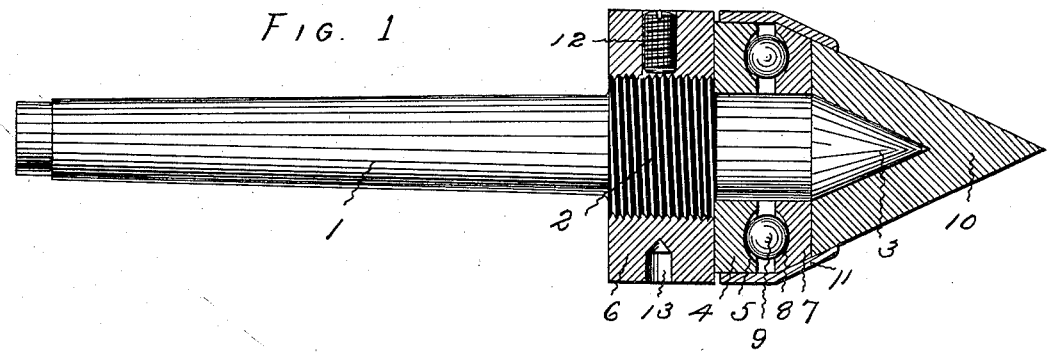
Figure 2:
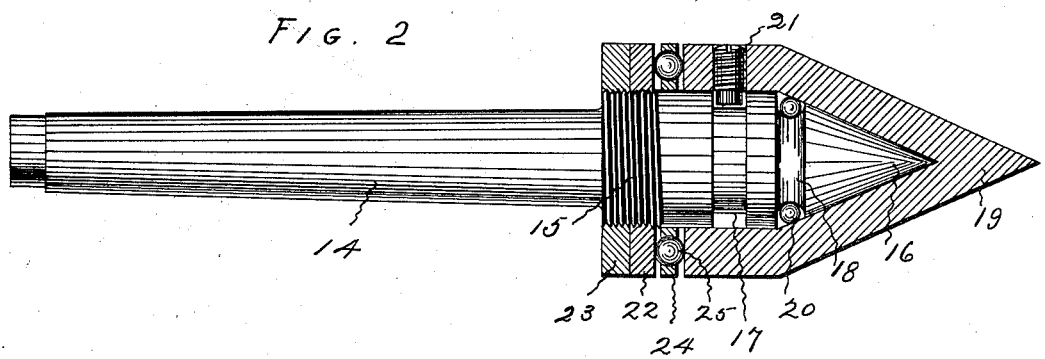
Figure 3:
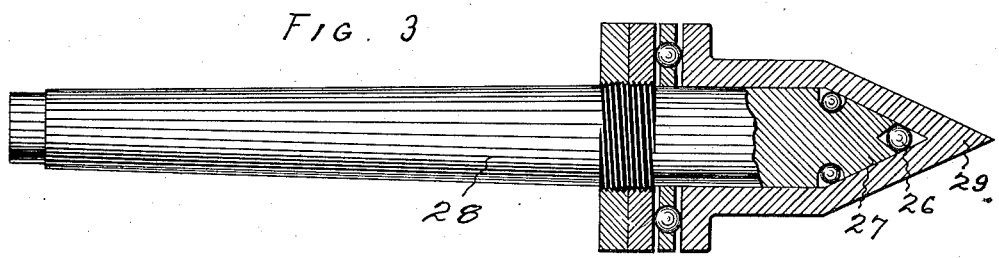

Figure 1 of the accompanying drawings shows a central longitudinal section of a center which embodies the invention. Fig. 2 shows a similar view of a modified form of center. Fig. 3 shows a central section of still another form.

The center shown in Fig. 1 has a shank 1 which has a threaded section 2, and a conical point 3. Loose on the shank between the threaded section and the point of this form of the device, is a collar 4 with a ball groove 5 in one face. This collar may or may not, as desired, be made integral with the nut 6 that turns on the threaded section of the shank. Loosely mounted on the shank in front of the collar 4 is a collar 7 with a ball groove 8 in one face. A ring of balls 9 is arranged in the grooves between these two collars. The conical tip 10 has a central tapering opening which conforms to and loosely fits the tapering point of the shank. This tip may or may not, as desired, be formed integral with the loose collar 7. A cap 11 is arranged over the collars and balls. This cap also extends over the base of the tip. The adjusting nut 6 may be provided with a set screw 12 for holding it in position, and desirably has spanner sockets 13, by means of which it may be turned on the threaded section of the shank against the back of the collar 4. After the stock to be turned or formed, is arranged in the lathe or other tool, and is supported at one end or on one side by the tip, the nut may be turned up to adjust the friction between the parts of the center and the pressure of the tip against the center of the stock.

The form shown in Fig. 2 has a shank 14 with a threaded section 15 and a tapering point 16. A groove 17 may be made in the shank between the threaded section and the point, and a ball groove 18 may be made in the shank still nearer the point. The tip 19 has an opening with a tapering section that conforms to and loosely fits the tapering point of the shank. Balls 20 may be arranged in the groove 18 between the shank and the interior wall of the tip. A screw 21 may be turned through the wall of the tip into the groove 17 for retaining the tip in place. On the threaded section of this shank is a ball nut 22 and a clamp nut 23. Between the ball nut and the rear end of the tip is a ball cage 24, holding a ring of balls 25. When this form is in use the ball nut is turned up to adjust the frictional engagement of the parts and the pressure of the tip against the center of the stock.

In the form shown in Fig. 3, which is substantially the same as that shown in Fig. 2, a ball 26 is placed in a recess between the pointed end 27 of the shank 28 and the apex of the recess in the conical tip 29.

In each of these three forms, the longitudinal pressure resulting from the thrust of the tip against the center of the stock to be turned, cut or otherwise formed in the machine, is resisted by the ring of balls arranged between the base of the tip and the nut which turn on the threaded section of the shank, which nut is readily adjusted to obtain the desired pressure. The lateral strains incident to the cutting or other operation performed on the stock are resisted by the engagement of the inner wall of the tip with the tapering point of the shank. In the forms shown in Figs. 2 and 3, the friction incident to such engagement is relieved to an extent by the balls arranged in the grooves in the points of the shanks.

The invention claimed is:

A lathe center having a shank with a threaded section and a tapering point, a tip having a tapering exterior and a tapering recess, loosely mounted on the pointed end of the shank, a nut turning on the threaded section of the shank, and balls arranged between the extreme rear edge of the tip and said nut, whereby said tip may at any time be adjusted longitudinally with relation to the shank by turning the nut.

WILLIAM J. McINTYRE.

Witnesses:
JOSEPHINE M. STREMPFER,
HARRY R. WILLIAMS.